(12) United States Patent
Yoo

(10) Patent No.: US 11,431,215 B2
(45) Date of Patent: Aug. 30, 2022

(54) ROTOR AND MOTOR HAVING SAME

(71) Applicant: LG INNOTEK CO., LTD., Seoul (KR)

(72) Inventor: Byeong Jong Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 86 days.

(21) Appl. No.: 16/955,150

(22) PCT Filed: Nov. 29, 2018

(86) PCT No.: PCT/KR2018/014893
§ 371 (c)(1),
(2) Date: Jun. 18, 2020

(87) PCT Pub. No.: WO2019/124799
PCT Pub. Date: Jun. 27, 2019

(65) Prior Publication Data
US 2021/0021164 A1    Jan. 21, 2021

(30) Foreign Application Priority Data

Dec. 18, 2017   (KR) .................. 10-2017-0174043

(51) Int. Cl.
*H02K 1/27* (2022.01)
*H02K 1/28* (2006.01)
(Continued)

(52) U.S. Cl.
CPC .............. *H02K 1/278* (2013.01); *H02K 1/28* (2013.01); *B62D 5/04* (2013.01)

(58) Field of Classification Search
CPC ...... H02K 1/278; H02K 1/28; H02K 2213/03; H02K 1/276; B62D 5/04
See application file for complete search history.

(56) References Cited

U.S. PATENT DOCUMENTS

| 7,948,134 B2 | 5/2011 | Jockel et al. |
| 2009/0079285 A1 | 3/2009 | Koumura |

(Continued)

FOREIGN PATENT DOCUMENTS

| CN | 102647034 A | 8/2012 |
| EP | 2 141 783 A2 | 1/2010 |

(Continued)

OTHER PUBLICATIONS

International Search Report dated Mar. 5, 2019 in International Application No. PCT/KR2018/014893.

(Continued)

*Primary Examiner* — Thomas Truong
(74) *Attorney, Agent, or Firm* — Saliwanchik, Lloyd & Eisenschenk

(57) ABSTRACT

An embodiment relates to a rotor comprising: a main body; an upper terminal disposed on an upper surface of the main body; and a lower terminal disposed on a lower surface of the main body, wherein the upper terminal comprises a first upper terminal and a second upper terminal; the lower terminal comprises a first lower terminal; the main body comprises a first hole and a second hole that penetrate the main body, wherein one end of the first lower terminal is connected to the first upper terminal through the first hole and the other end is connected to the second upper terminal through the second hole by means of a bus bar, and to a motor comprising the same. As such, it is possible to enhance space utilization inside the motor.

20 Claims, 10 Drawing Sheets

(51) Int. Cl.
    *H02K 1/278*    (2022.01)
    *B62D 5/04*     (2006.01)

(56)            References Cited

U.S. PATENT DOCUMENTS

2011/0291500 A1*  12/2011  Tang ................ H02K 11/33
                                                          310/64
2013/0099617 A1*  4/2013   Chamberlin ......... H02K 1/2766
                                                       310/156.21
2016/0344245 A1   11/2016  Sagalovskiiy et al.

FOREIGN PATENT DOCUMENTS

EP          3 139 470 A1       3/2017
JP          2004007937 A   *   1/2004
JP          2016-127771 A      7/2016
WO       WO-2014/183843 A2    11/2014
WO       WO-2016/177968 A1    11/2016

OTHER PUBLICATIONS

Supplementary European Search Report dated Jul. 30, 2021 in European Application No. 18892232.2.

* cited by examiner

[FIG. 1]
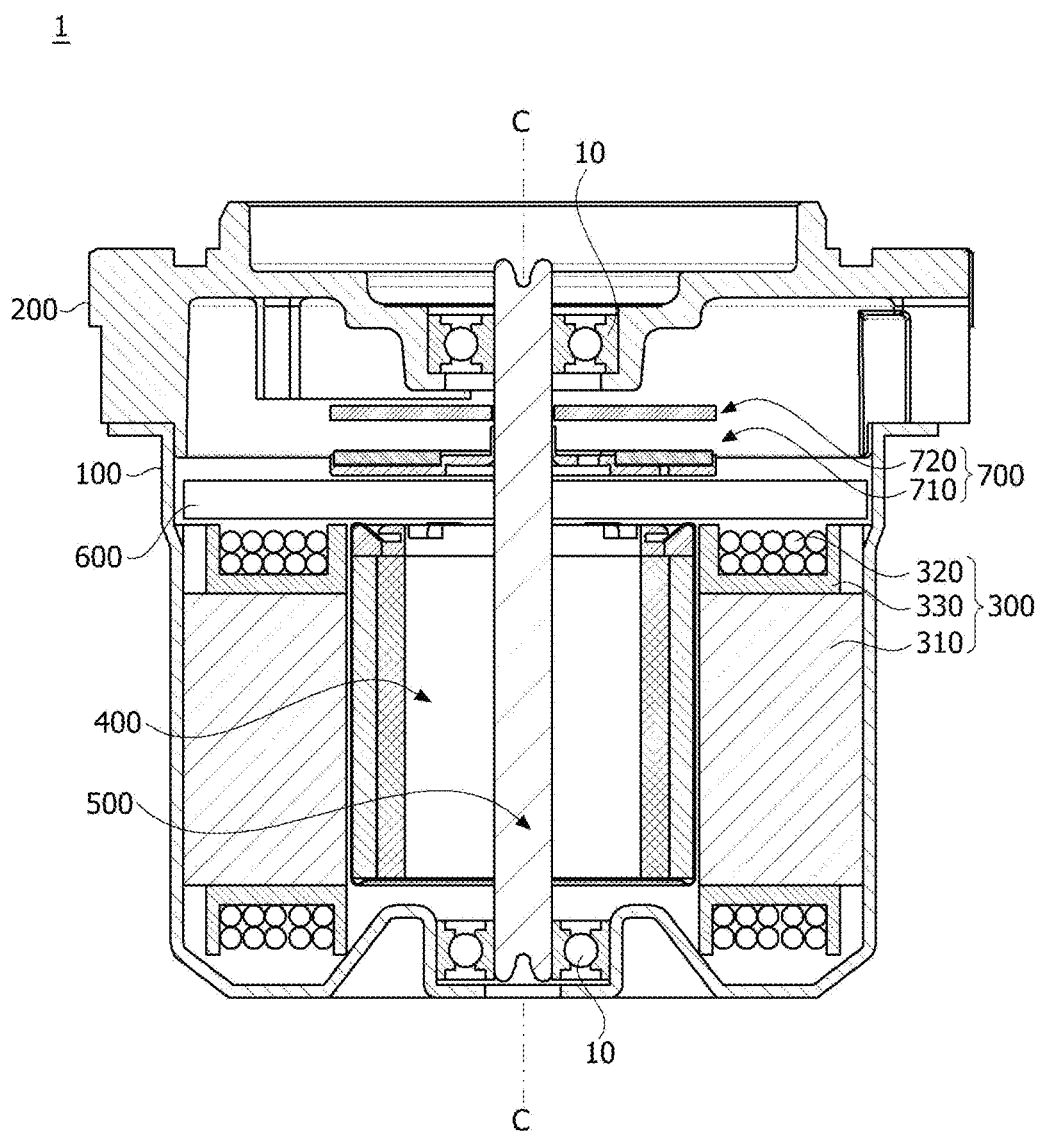

[FIG. 2]
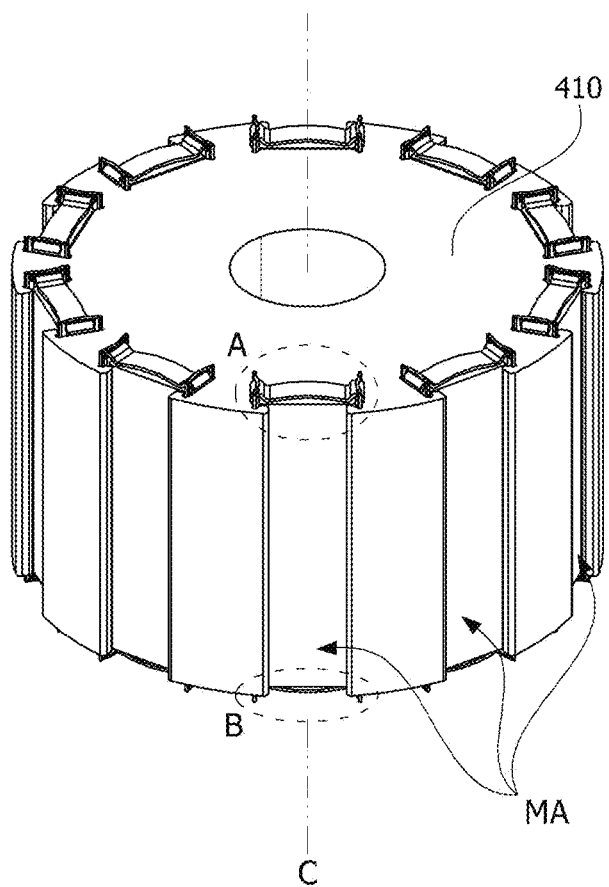

[FIG. 3]
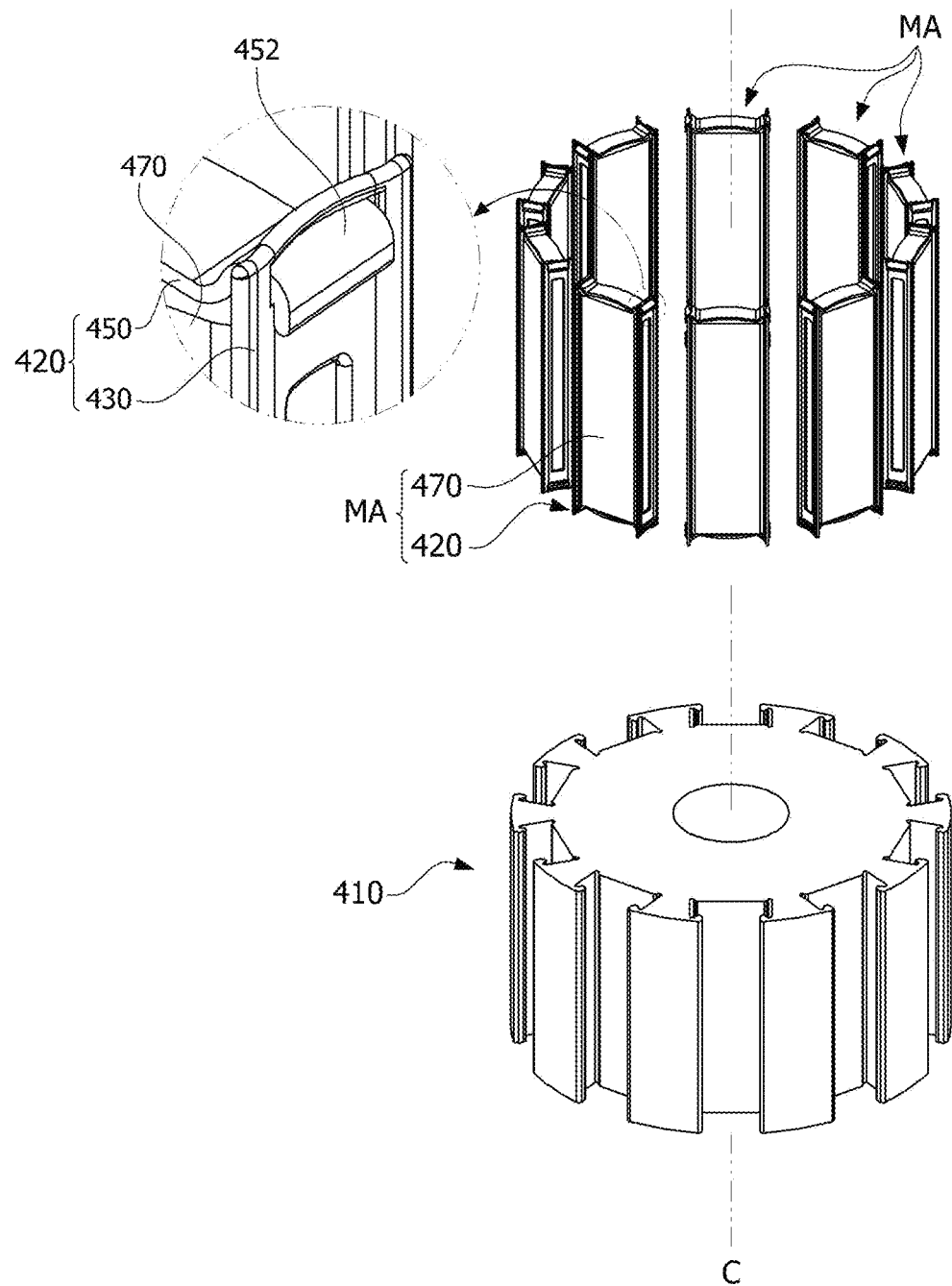

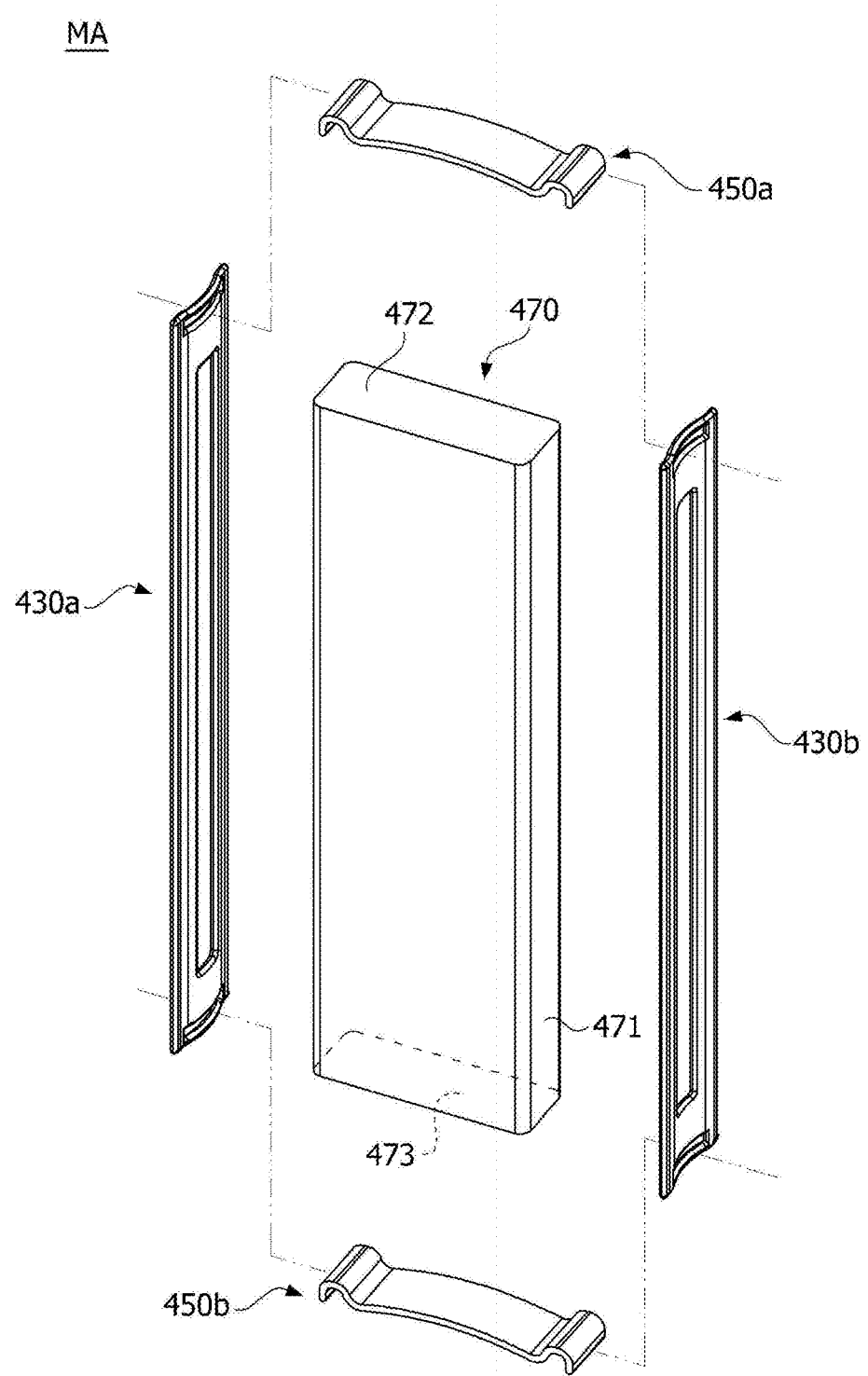

[FIG. 5]
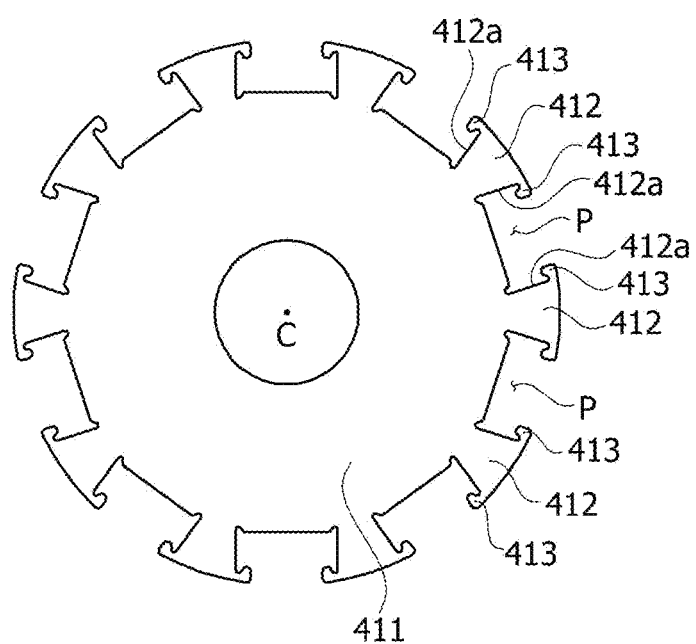

[FIG. 6]
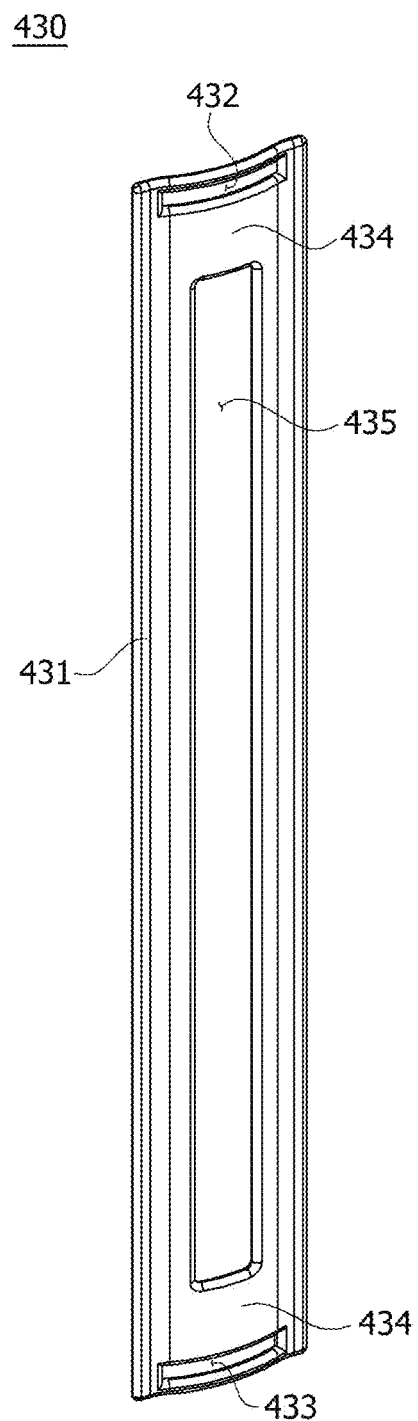

[FIG. 7]
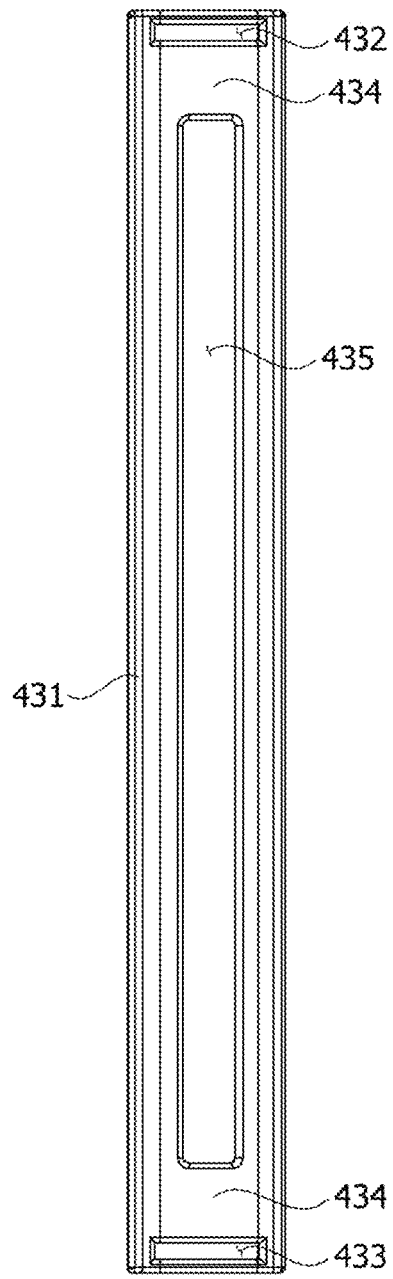

[FIG. 8]
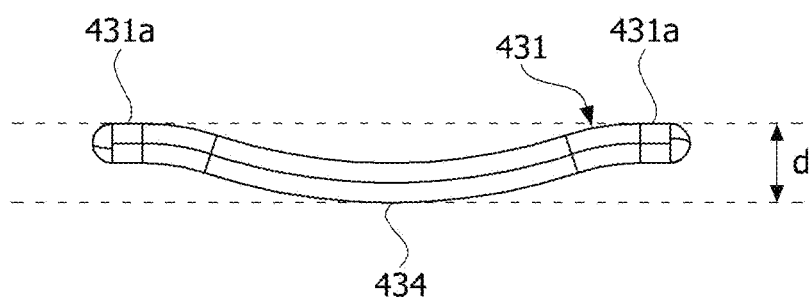
[FIG. 9]
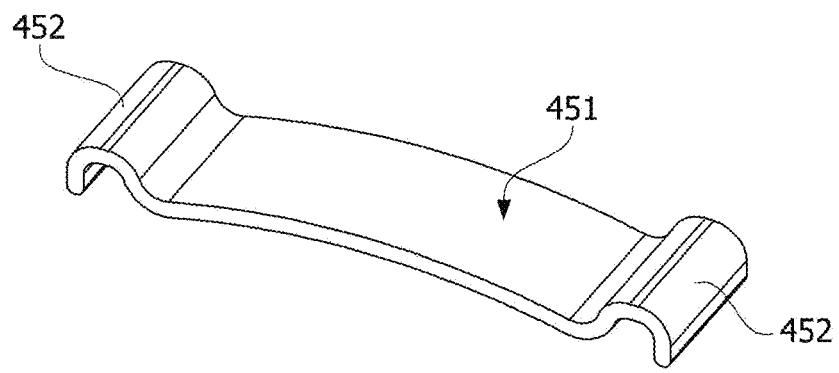

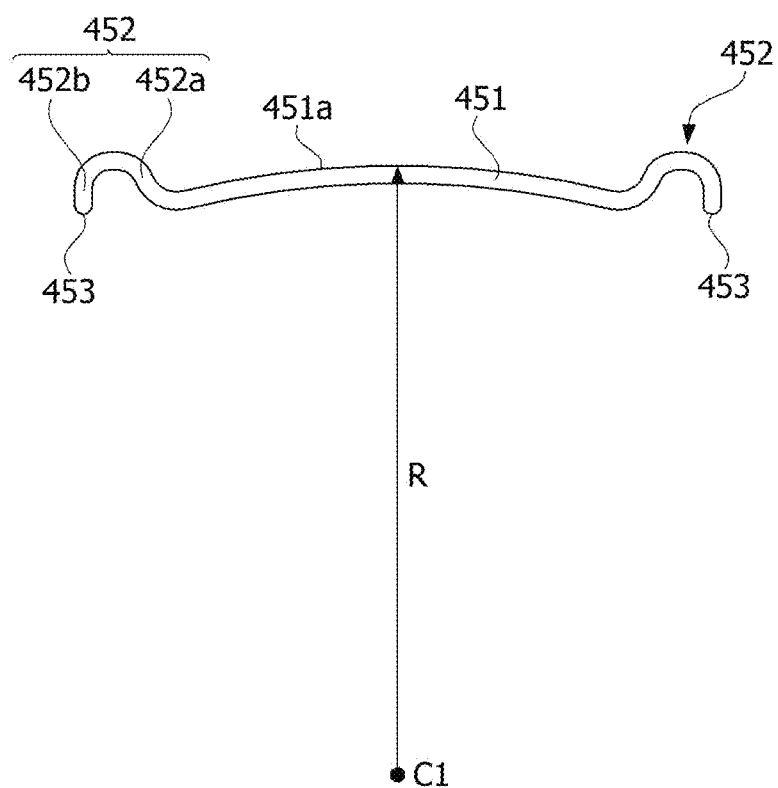

[FIG. 11]
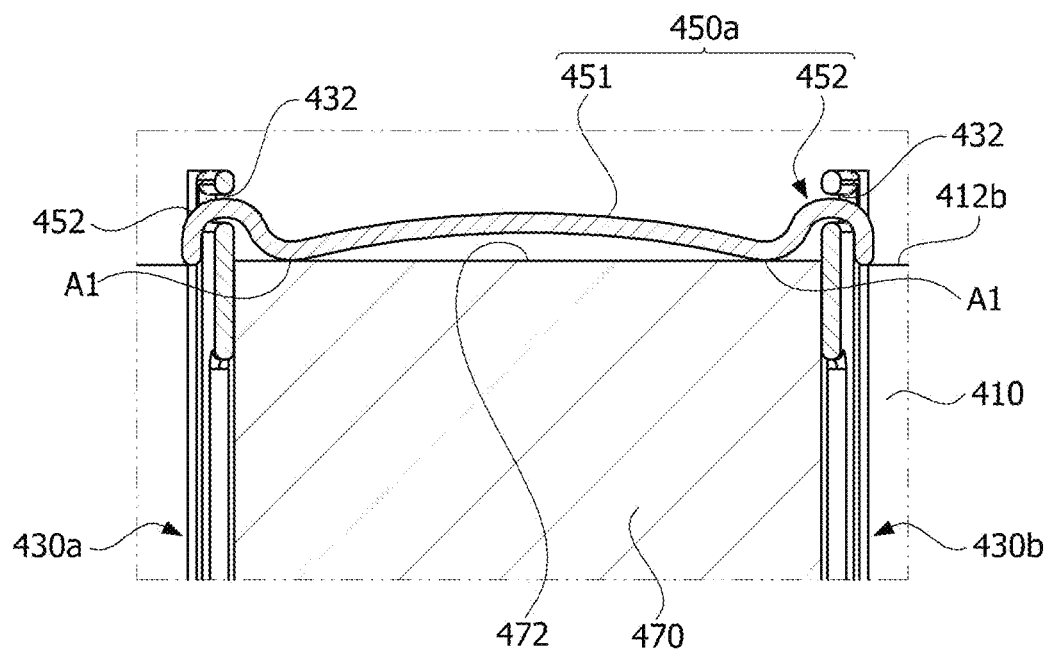
[FIG. 12]
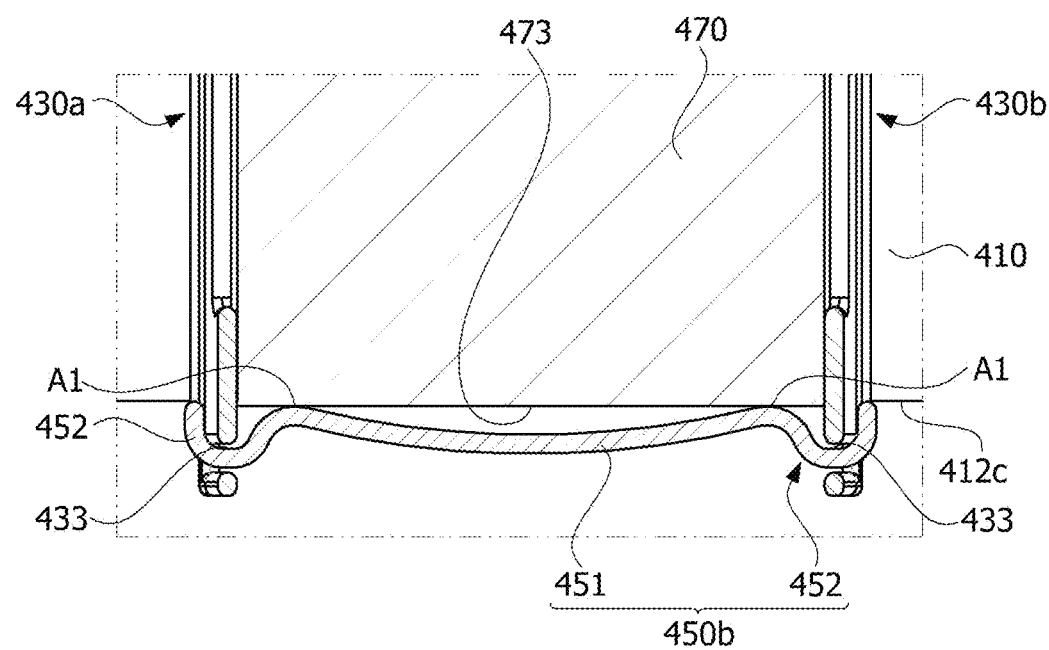

ROTOR AND MOTOR HAVING SAME

CROSS-REFERENCE TO RELATED APPLICATIONS

This application is the U.S. national stage application of International Patent Application No. PCT/KR2018/014893, filed Nov. 29, 2018, which claims the benefit under 35 U.S.C. § 119 of Korean Patent Application No. 10-2017-0174043, filed Dec. 18, 2017, the disclosures of each of which are incorporated herein by reference in their entirety.

TECHNICAL FIELD

The present invention relates to a rotor and a motor including the same.

BACKGROUND ART

Motors are apparatuses configured to convert electrical energy to mechanical energy to obtain rotational forces and are widely used for vehicles, home appliances, industrial machines, and the like.

A motor may include a housing, a shaft, a stator disposed on an inner circumferential surface of the housing, and a rotor installed on an outer circumferential surface of the shaft. In this case, the stator of the motor electrically interacts with the rotor to cause rotation of the rotor In this case, the rotor is divided into a surface permanent magnet (SPM) type rotor and an interior permanent magnet (IPM) type rotor according to a coupling structure of a magnet installed on a rotor core.

Particularly, in the case of the IPM type rotor, a magnet member is inserted into the rotor core using an adhesive member and is magnetized through a magnetization process.

However, there is a problem in that productivity is decreased because it takes time to apply the adhesive member onto the magnet member, insert the magnet member into the rotor core, and cure the adhesive member.

In addition, there is a problem in that productivity is further decreased because the process in which the magnet member is magnetized is required.

In addition, since an additional space for a magnetization apparatus for the magnetization process is required in an assembly line, space efficiency is reduced.

Technical Problem

The present invention is directed to providing a rotor with improved productivity by simplifying an assembly process, in which a process of applying an adhesive member onto a magnet and a magnetization process are omitted, and a motor including the same.

Objectives that should be solved according to embodiments are not limited to the above described objectives, and other objectives which are not described above will be clearly understood by those skilled in the art from the following specification.

Technical Solution

One aspect of the present invention provides a rotor including a rotor core including a pocket portion, a guide disposed in the pocket portion, and a magnet disposed in the guide, wherein the guide includes a first side guide disposed on one side surface of the magnet, a second side guide disposed the other side surface of the magnet, an upper guide coupled to an upper side of the first side guide and an upper side of the second side guide, and a lower guide coupled to a lower side of the first side guide and a lower side of the second side guide.

Each of the first side guide and the second side guide may include a first hole and a second hole, one side of the upper guide may be coupled to the first hole of the first side guide, the other side of the upper guide may be coupled to the first hole of the second side guide, one side of the lower guide may be coupled to the second hole of the first side guide, and the other side of the lower guide may be coupled to the second hole of the second side guide.

The first side guide may further include a third hole, and the third hole may be disposed between the first hole and the second hole.

The first side guide may include a curved surface bent toward the magnet.

The third hole may be formed in the curved surface, and the third hole may be formed in a longitudinal direction of the first side guide.

Each of the upper guide and the lower guide may include a main body formed to have a predetermined curvature and end portions extending from both ends of the main body to have a curvature different from the predetermined curvature.

The end portion may be disposed to be inserted into the first hole or the second hole.

One region in which the main body of the upper guide meets the end portion may be in contact with an upper surface of the magnet.

An end of the end portion of the upper guide may be in contact with an upper surface of the rotor core.

Meanwhile, each of the first side guide and the second side guide may be formed of an elastic material having an elastic force.

In addition, each of the first side guide and the second side guide may be pressed against the side surface of the magnet due to the elastic force of the elastic material.

Another aspect of the present invention provides a rotor including a rotor core including a pocket portion, a guide disposed in the pocket portion, and a magnet disposed in the guide, wherein the guide includes a pair of side guides disposed on side surfaces of the magnet, an upper guide coupled to an upper side of the side guide, and a lower guide coupled to a lower side of the side guide.

Still another aspect of the present invention provides a rotor including a housing, a stator disposed in the housing, a rotor disposed in the stator, a shaft coupled to the rotor, and a cover disposed on the housing, wherein the rotor includes a rotor core including a pocket portion, a guide disposed in the pocket portion, and a magnet disposed in the guide, and the guide includes a first side guide disposed on one side surface of the magnet, a second side guide disposed on the other side surface of the magnet, an upper guide coupled to an upper side of the first side guide and an upper side of the second side guide, and a lower guide coupled to a lower side of the first side guide and a lower side of the second side guide.

In this case, each of the first side guide and the second side guide may include a first hole and a second hole, one side of the upper guide may be coupled to the first hole of the first side guide, the other side of the upper guide may be coupled to the first hole of the second side guide, one side of the lower guide may be coupled to the second hole of the first side guide, and the other side of the lower guide may be coupled to the second hole of the second side guide.

Advantageous Effects

According to embodiments, in a rotor according to embodiments including the above-described structure and a motor including the same, since a magnet is disposed in a rotor core using a guide, productivity can be improved.

In an assembly process of the motor, since a process of applying an adhesive member onto the magnet to be attached and a magnetization process are omitted using the guide to simplify the assembly process, productivity can be improved.

Useful advantages and effects of the embodiments are not limited to the above-described contents and will be more easily understood from descriptions of the specific embodiments.

DESCRIPTION OF DRAWINGS

FIG. 1 is a view illustrating a motor according to an embodiment.

FIG. 2 is a perspective view illustrating a rotor of the motor according to the embodiment.

FIG. 3 is an exploded perspective view illustrating the rotor of the motor according to the embodiment.

FIG. 4 is an exploded perspective view illustrating a magnet assembly of the motor according to the embodiment.

FIG. 5 is a plan view illustrating a rotor core of the motor according to the embodiment.

FIG. 6 is a perspective view illustrating a side guide of the magnet assembly disposed in the motor according to the embodiment.

FIG. 7 is a front view illustrating the side guide of the magnet assembly disposed in the motor according to the embodiment.

FIG. 8 is a plan view illustrating the side guide of the magnet assembly disposed in the motor according to the embodiment.

FIG. 9 is a perspective view illustrating a fixing guide of the magnet assembly disposed in the motor according to the embodiment.

FIG. 10 is a front view illustrating the fixing guide of the magnet assembly disposed in the motor according to the embodiment.

FIG. 11 is a view illustrating region A of FIG. 2.

FIG. 12 is a view illustrating region B of FIG. 2.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both of a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

FIG. 1 is a view illustrating a motor according to an embodiment.

Referring to FIG. 1, a motor 1 according to the embodiment may include a housing 100 of which an opening is formed at one side, a cover 200 disposed on the housing 100, a stator 300 disposed in the housing 100, a rotor 400 disposed inside the stator 300, a shaft 500 rotated with the rotor 400, a bus bar 600 disposed on the stator 300, and a sensor part 700 configured to detect rotation of the shaft 500. In this case, "inside" refers to a direction in which components are disposed toward a center C around the center C and "outside" refers to a direction opposite to "inside"

The motor 1 may be used as a motor used in an electronic power steering (EPS) system. The EPS system may assist a steering force using a driving force of the motor to secure turning stability and quickly provide a restoring force of a vehicle. Accordingly, a driver of the vehicle can safely travel.

The housing 100 and the cover 200 may form an exterior of the motor 1. In addition, the housing 100 may be coupled to the cover 200 to form an accommodation space. Accordingly, as illustrated in FIG. 1, the stator 300, the rotor 400, the shaft 500, and the like may be disposed in the accommodation space. In this case, the shaft 500 is rotatably disposed in the accommodation space. Accordingly, the motor 1 may further include bearings 10 disposed on an upper portion and a lower portion of the shaft 500.

The housing 100 may be formed to have a cylindrical shape. In addition, the stator 300, the rotor 400, and the like may be accommodated in the housing 100. In this case, a shape or a material of the housing 100 may be variously changed. For example, the housing 100 may be formed of a metal material which withstands even high temperatures well.

The cover 200 may be disposed on an opening surface of the housing 100, that is, disposed on the housing 100, to cover the opening of the housing 100.

The stator 300 may be disposed inside the housing 100. In this case, the stator 300 may be supported by an inner circumferential surface of the housing 100. In addition, the stator 300 is disposed outside the rotor 400. That is, the rotor 400 may be rotatably disposed inside the stator 300.

Referring to FIG. 1, the stator 300 may include a stator core 310, coils 320 wound around the stator core 310, and an insulator 330 disposed between the stator core 310 and the coils 320.

The coils 320 configured to generate a rotating magnetic field may be wound around the stator core 310. In this case, the stator core 310 may be formed as one core or a plurality of divided cores which are coupled to each other.

The stator core 310 may be formed by stacking a plurality of thin steel plates but is not limited thereto. For example, one single product may also be formed as the stator core 310.

The stator core 310 may include a yoke (not shown) having a cylindrical shape and a plurality of teeth (not shown).

In this case, the teeth may be disposed to protrude from the yoke in a radius direction around the center C of the stator core 310. In addition, the plurality of teeth may be disposed to be spaced apart from each other in a circumferential direction of the yoke. Accordingly, slots may be formed between the teeth.

Meanwhile, the teeth may be disposed to face magnets 470 of the rotor 400. In addition, the coils 320 are wound around the teeth.

The insulator 330 insulates the stator core 310 from the coils 320. Accordingly, the insulator 330 may be disposed between the stator core 310 and the coils 320.

Accordingly, the coils 320 may be wound around the stator core 310 on which the insulator 330 is disposed.

The rotor 400 may be disposed inside the stator 300. In addition, the shaft 500 may be coupled to a central portion of the rotor 400.

FIG. 2 is a perspective view illustrating the rotor of the motor according to the embodiment, FIG. 3 is an exploded perspective view illustrating the rotor of the motor according to the embodiment, and FIG. 4 is an exploded perspective view illustrating a magnet assembly of the motor according to the embodiment.

Referring to FIGS. 2 and 3, the rotor 400 may include a rotor core 410 including pocket portions P and magnet assemblies MA disposed in the pocket portions P.

The magnet assemblies MA may include guides 420 and the magnets 470 disposed inside the guides 420. In addition, the guides 420 may include pairs of side guides 430 and pairs of fixing guides 450. In this case, the magnet 470 may be formed to have a hexahedral shape.

The pair of side guides 430 may be divided into a first side guide 430a and a second side guide 430b according to arrangement positions with respect to the magnet 470. In this case, the first side guide 430a and the second side guide 430b are illustrated to have the same shape but are not necessarily limited thereto. For example, the first side guide 430a and the second side guide 430b may be formed to have different shapes in consideration of a position of the magnet 470 in the pocket portion P.

In addition, the fixing guides 450 may be divided into an upper guide 450a and a lower guide 450b according to the arrangement positions with respect to the magnet 470. In this case, the upper guide 450a and the lower guide 450b are illustrated to have the same shape but are not necessarily limited thereto. For example, the upper guide 450a and the lower guide 450b may also be formed to have different shapes in consideration of a coupling relationship with the side guides 430, the position of the magnet 470 in the pocket portion P, and the like.

Accordingly, the guide 420 may include the pair of side guides 430, the upper guide 450a, and the lower guide 450b. As illustrated in FIG. 4, the guide 420 may include the first side guide 430a, the second side guide 430b, the upper guide 450a, and the lower guide 450b.

The magnet 470 is disposed in the pocket portion P of the rotor core 410 using the guide 420. Accordingly, in the rotor 400, since an application process of an adhesive onto the magnet 470 and a curing process may be omitted in an assembly process of the motor 1, productivity of the motor 1 can be improved.

In this case, since the magnetized magnet 470 is disposed in the guide 420, a magnetization process is omitted in the assembly process of the motor 1, and the productivity of the motor 1 can be further improved. Generally, in a rotor, in a state in which a magnet member is disposed in a rotor core, a magnetization process is performed to magnetize the magnet member. Accordingly, the general motor requires an additional magnetization process.

The shaft 500 is coupled to the central portion of the rotor core 410. In this case, the rotor core 410 may be formed by stacking a plurality of thin steel plates but is not necessarily limited thereto. For example, one single product may be formed as the rotor core 410.

FIG. 5 is a plan view illustrating the rotor core of the motor according to the embodiment.

Referring to FIG. 5, the rotor core 410 may include a rotor core main body 411 and a plurality of protrusion portions 412 protruding from an outer side surface of the rotor core main body 411 in the radius direction. In addition, the rotor core 410 may further include protrusions 413 formed on the protrusion portions 412 inhibit separation of the magnet assemblies MA.

The shaft 500 is coupled to a central portion of the rotor core main body 411. To this end, a hole may be formed in the central portion of the rotor core main body 411.

The plurality of protrusion portions 412 may be disposed to be spaced apart from each other in a circumferential direction. Accordingly, the pocket portions P may be formed between the protrusion portions 412.

The protrusion portions 412 guide arrangement of the magnet assemblies MA. In addition, when the motor 1 is driven, the protrusion portions 412 inhibit the magnet assemblies MA from moving in the circumferential direction.

The protrusions 413 may be formed to protrude from both sides of the protrusion portions 412 in the circumferential direction. Accordingly, when the motor 1 is driven, the protrusions 413 inhibit the magnet assemblies MA from being separated in the radius direction.

Referring to FIG. 3, the guide 420 may be disposed to surround the magnet 470.

In this case, the guide 420 may be formed of an elastic material having an elastic force. For example, the guide 420 may be formed of spring steel. Specifically, SK5 or steel use stainless (SUS) based spring steel may be used for the guide 420. Accordingly, when the magnet assembly MA is disposed in the pocket portion P, one sides of the first side guide 430a and the second side guides 430b are supported by side surfaces 412a of the protrusion portions 412 and the other sides are pressed against side surfaces 471 of the magnet 470 due to an elastic force of an elastic material.

Referring to FIGS. 3 and 5, the first side guide 430a and the second side guide 430b are disposed at both sides of the magnet 470 with respect to the magnet 470, the upper guide 450a is disposed on the magnet 470, and the lower guide 450b is disposed below the magnet 470.

The pair of side guides 430 may be disposed on one side surface and the other side surface of the magnet 470. For example, the first side guide 430a is disposed on one side surface of the magnet 470, and the second side guide 430b is disposed on the other side surface of the magnet 470.

FIG. 6 is a perspective view illustrating the side guide of the magnet assembly disposed in the motor according to the embodiment, FIG. 7 is a front view illustrating the side guide of the magnet assembly disposed in the motor according to the embodiment, and FIG. 8 is a plan view illustrating the side guide of the magnet assembly disposed in the motor according to the embodiment.

Referring to FIGS. 6 to 8, the side guides 430 may include side guide main bodies 431, and first holes 432 and second holes 433 which are formed in the side guide main body 431.

In addition, the side guide 430 may further include a curved surface 434 bent toward the magnet. In this case, the curved surface 434 of the side guide 430 may be referred to as a first curved surface 434. In addition, a direction toward the magnet may be referred to as a direction in which the curved surface 434 is bent to protrude toward the magnet 470.

In addition, the side guides 430 may further include third holes 435 disposed between the first holes 432 and the second holes 433.

The side guide main body 431 may be formed to have a plate shape that is vertically elongated.

As illustrated in FIGS. 6 and 7, the first hole 432 may be formed at an upper side of the side guide main body 431. In addition, the first hole 432 may be coupled to an end portion 452 of the fixing guide 450. For example, any one of both end portions of the upper guide 450a is coupled to the first hole 432 of the first side guide 430a and the other one is coupled to the first hole 432 of the second side guide 430b.

As illustrated in FIGS. 6 and 7, the second hole 433 may be formed at a lower side of the side guide main body 431. In addition, the second hole 433 may be coupled to the end portion 452 of the fixing guide 450. For example, any one of both end portions 452 of the lower guide 450b is coupled to the second hole 433 of the first side guide 430a and the other one is coupled to the second hole 433 of the second side guide 430b.

Accordingly, the magnet 470 may be fixed in the guide 420 due to the upper guide 450a and the lower guide 450b coupled to upper portions and lower portions of the pair of side guides 430.

One region of the side guide main body 431 may be bent toward the magnet 470 to form the curved surface 434. In this case, the curved surface 434 formed on the side guide main body 431 may be disposed toward the magnet 470. Accordingly, the curved surface 434 may be in contact with the side surface 471 of the magnet 470.

In this case, a contact surface 431a disposed opposite the curved surface 434 with respect to the side guide main body 431 may be in contact with the side surface 412a of the protrusion portion 412.

As illustrated in FIG. 8, when the side guide 430 is viewed from above, the curved surface 434 and the contact surface 431a are disposed to be spaced apart from each other by a predetermined distance d when viewed from above. Accordingly, an elastic force of the side guide 430 may be further increased.

The curved surface 434 is illustrated to be disposed toward the magnet 470 as an example but is not necessarily limited thereto. For example, the curved surface 434 may also be disposed toward the side surface 412a of the protrusion portion 412.

Referring to FIGS. 6 and 7, the third hole 435 may be disposed between the first hole 432 and the second hole 433. In addition, the third hole 435 may be formed in the curved surface 434. In this case, the third hole 435 may be formed in a longitudinal direction of the side guide main body 431.

Since the third hole 435 is formed in the curved surface 434, an area of the curved surface 434 is decreased. Accordingly, a region in which the curved surface 434 is in contact with the side surface 471 of the magnet 470 is decreased. That is, the area of the curved surface 434 is decreased in the side guide main body 431 due to the third hole 435.

In a state in which the pair of side guides 430 are coupled to the lower guide 450b, when the pair of side guides 430 are disposed in the pocket portion P and the magnet 470 is disposed between the pair of side guides 430, a frictional force applied to the side surface of the magnet 470 may be minimized due to the curved surface 434.

In addition, since the third hole 435 is formed in the side guide 430, a cost of the side guide 430 can be reduced. In addition, a weight of the motor 1 can be decreased.

Meanwhile, the first side guide 430a and the second side guide 430b are formed to have the same shape, but arrangement positions thereof are different with respect to the magnet 470. In this case, the curved surface 434 of the first side guide 430a may be disposed opposite to the curved surface 434 of the second side guide 430b in the pocket portion P.

Two fixing guides 450 may be disposed at the upper portion and the lower portion of the side guide 430.

FIG. 9 is a perspective view illustrating the fixing guide of the magnet assembly disposed in the motor according to the embodiment, FIG. 10 is a front view illustrating the fixing guide of the magnet assembly disposed in the motor according to the embodiment, FIG. 11 is a view illustrating region A of FIG. 2, and FIG. 12 is a view illustrating region B of FIG. 2.

Referring to FIGS. 9 and 10, the fixing guide 450 may include a main body 451 formed to have a predetermined curvature 1/R and end portions 452 formed to extend from both ends of the main body 451. In this case, the main body 451 and the end portions of the fixing guide 450 may be integrally formed.

A curvature 1/R of the end portion 452 may be different from the curvature 1/R of the main body 451. For example, the end portion 452 may include a curved surface having the curvature 1/R which is different from the curvature 1/R of the main body 451. As illustrated in FIG. 10, the end portion 452 may be formed to have a hook shape.

The main body 451 may be formed to have a curved shape by bending a central portion of the main body 451 in a direction opposite to the direction toward the magnet 470. As an example, the main body 451 may include a curved surface 451a formed to have a predetermined curvature 1/R, and a center C1 of the curvature 1/R may be positioned in the magnet 470. In this case, in order to distinguish the curved surface 451a of the main body 451 from the curved surface 434 of the side guide 430, the curved surface 451a may be referred to as a second curved surface 451a.

The end portion 452 may pass through the first hole 432 or the second hole 433 of the side guide 430 and inserted into the side guide 430. For example, the end portion 452 of the upper guide 450a is coupled to the first hole 432 of the side guide 430 and the end portion 452 of the lower guide 450b is coupled to the second hole 433 of the side guide 430.

Accordingly, a structure pressing against the magnet 470 is formed due to one region of the fixing guide 450 in which the main body 451 meets the end portion 452.

Referring to FIG. 10, the end portion 452 may include a first extension portion 452a extending from the main body 451 and a second extension portion 452b extending from the first extension portion 452a.

The first extension portion 452a may extend from an end portion of the main body 451 in the direction opposite to the direction toward the magnet 470. In this case, a contact region, which is one region A1 in which the main body 451 meets the first extension portion 452a, is in contact with the magnet 470.

As illustrated in FIG. 11, the curved surface 451a of the upper guide 450a is disposed to face upward. In addition, the first extension portion 452a of the upper guide 450a extends upward from the end portion of the main body 451. Accordingly, one region A1 in which the main body 451 of the upper guide 450a meets the first extension portion 452a is in contact with an upper surface 472 of the magnet 470.

As illustrated in FIG. 12, the curved surface 451a of the lower guide 450b is disposed to face downward. In addition, the first extension portion 452a of the lower guide 450b extends downward from the end portion of the main body 451. Accordingly, one region A1 in which the main body 451 of the lower guide 450b meets the first extension portion 452a is in contact with a lower surface 473 of the magnet 470.

The second extension portion 452b may extend from an end portion of the first extension portion 452a toward the magnet 470.

In this case, an end 453 of the end portion 452 of the fixing guide 450 is in contact with the rotor core 410.

As illustrated in FIG. 11, the end 453 of the end portion 452 of the upper guide 450a is in contact with an upper surface 412b of the protrusion portion 412 disposed on the rotor core 410.

As illustrated in FIG. 12, the end 453 of the end portion 452 of the lower guide 450b is in contact with a lower surface 412c of the protrusion portion 412 disposed on the rotor core 410.

Accordingly, a structure in which the end 453 of the upper guide 450a and the end 453 of the lower guide 450b are in contact with the rotor core 410 inhibits the magnet assembly MA from vertically moving.

The magnet 470 and the coils 320 wound around the stator 300 generate a rotating magnetic field. As illustrated in FIG. 2, the magnets 470 may be disposed such that N-poles and S-poles are alternately disposed around the center C in the circumferential direction.

Accordingly, the rotor 400 is rotated due to an electrical interaction between the coils 320 and the magnet 470, and when the rotor 400 is rotated, the shaft 500 is rotated so that a driving force of the motor 1 is generated.

As illustrated in FIG. 1, the shaft 500 may be rotatably supported by the bearings 10 in the housing 100. In addition, the shaft 500 may be rotated in conjunction with the rotation of the rotor 400.

The bus bar 600 may be disposed on the stator 300.

In addition, the bus bar 600 may be electrically connected to the coils 320 of the stator 300.

The bus bar 600 may include a bus bar main body and a plurality of terminals disposed in the bus bar main body. In this case, the bus bar main body may be a molded product formed through an injection molding process. In addition, the terminals may be electrically connected to the coils 320 of the stator 300.

The sensor part 700 may detect a magnetic force of a sensing magnet installed to be rotatable in conjunction with the rotor 400 to check a present position of the rotor 400 so as to detect rotation of the shaft 500.

The sensor part 700 may include a sensing magnet assembly 710 and a printed circuit board (PCB) 720.

The sensing magnet assembly 710 is coupled to the shaft 500 to be operated in conjunction with the rotor 400 and detects a position of the rotor 400. In this case, the sensing magnet assembly 710 may include a sensing magnet and a sensing plate. The sensing magnet and the sensing plate may be coaxially coupled.

The sensing magnet may include a main-magnet disposed close to a hole forming an inner circumferential surface of the sensing magnet in the circumferential direction and a sub-magnet formed at an edge of the sensing magnet. The main-magnet may be disposed to be the same as a drive magnet inserted into the rotor 400 of the motor. The sub-magnet is further subdivided than the main-magnet to have many poles. Accordingly, a rotating angle may be more finely divided and measured, and thus the motor can be more smoothly driven.

The sensing plate may be formed of a metal material having a disc shape. The sensing magnet may be coupled to an upper surface of the sensing plate. In addition, the sensing plate may be coupled to the shaft 500. In this case, a hole through which the shaft 500 passes is formed in the sensing plate.

A sensor configured to detect a magnetic force of the sensing magnet may be disposed on the PCB 720. In this case, the sensor may be provided as a Hall integrated circuit (IC). In addition, the sensor may detect a change in N-pole and a change in S-pole of the sensing magnet and generate a sensing signal.

While the present invention has been shown and described with reference to the exemplary embodiments thereof, it will be understood by those skilled in the art that various changes in form and details may be made therein without departing from the spirit and scope of the invention as defined by the appended claims. In addition, it should be understood that differences related to modifications and changes fall within the scope of the present invention defined by the appended claims.

REFERENCE NUMERALS

| | |
|---|---|
| 1: MOTOR | 10: BEARINGS |
| 100: HOUSING | 200: COVER |
| 300: STATOR | 400: ROTOR |
| 410: ROTOR CORE | 420: GUIDE |
| 430: SIDE GUIDE | 430A: FIRST SIDE GUIDE |
| 430B: SECOND SIDE GUIDE | 431: SIDE GUIDE MAIN BODY |
| 432: FIRST HOLE | 433: SECOND HOLE |
| 434: CURVED SURFACE | 435: THIRD HOLE |
| 450A: UPPER GUIDE | 450B: LOWER GUIDE |
| 451: MAIN BODY | 452: END PORTION |
| 470: MAGNET | 500: SHAFT |
| 600: BUS BAR | 700: SENSOR PART |

The invention claimed is:

1. A rotor comprising:
a rotor core including a pocket portion;
a guide disposed in the pocket portion; and a magnet disposed in the guide,
wherein the guide includes:
a first side guide disposed on a first side surface of the magnet;
a second side guide disposed on a second side surface of the magnet;
an upper guide coupled to an upper side of the first side guide and an upper side of the second side guide; and
a lower guide coupled to a lower side of the first side guide and a lower side of the second side guide,
wherein the upper guide is removably coupled to the first side guide and the second side guide, and
wherein the lower guide is removably coupled to the first side guide and the second side guide.

2. The rotor of claim 1, wherein:
each of the first side guide and the second side guide includes a first hole and a second hole;
a first side of the upper guide is coupled to the first hole of the first side guide;
a second side of the upper guide is coupled to the first hole of the second side guide;
a first side of the lower guide is coupled to the second hole of the first side guide; and
a second side of the lower guide is coupled to the second hole of the second side guide.

3. The rotor of claim 2, wherein:
the first side guide further includes a third hole; and
the third hole is disposed between the first hole and the second hole.

4. The rotor of claim 3, wherein the first side guide includes a curved surface bent toward the magnet.

5. The rotor of claim 4, wherein:
the third hole is formed in the curved surface; and
the third hole is formed in a longitudinal direction of the first side guide.

6. The rotor of claim 1, wherein each of the upper guide and the lower guide includes a main body formed to have a predetermined curvature and end portions extending from both ends of the main body to have a curvature different from the predetermined curvature.

7. The rotor of claim 6, wherein each of the first side guide and the second side guide includes a first hole and a second hole,
wherein each end portion is inserted into the first hole of the first side guide, the first hole of the second side guide, the second hole of the first side guide, or the second hole of the second side guide.

8. The rotor of claim 7, wherein one region in which the main body of the upper guide meets one of the end portions of the upper guide is in contact with an upper surface of the magnet.

9. The rotor of claim 8, wherein an end of at least one of the end portions of the upper guide is in contact with an upper surface of the rotor core.

10. The rotor of claim 1, wherein each of the first side guide and the second side guide is formed of an elastic material having an elastic force.

11. The rotor of claim 10, wherein each of the first side guide and the second side guide is pressed against the side surface of the magnet due to the elastic force of the elastic material.

12. The rotor of claim 1, wherein the upper guide comprises a first curved end portion removably coupled to the upper side of the first side guide and a second curved end portion opposite from the first curved end portion and removably coupled to the upper side of second side guide, and
wherein the lower guide comprises a first curved end portion removably coupled to the lower side of the first side guide and a second curved end portion opposite from the first curved end portion and removably coupled to the lower side of second side guide.

13. The rotor of claim 12, wherein the first side guide comprises a first hole through the upper side thereof and a second hole through the lower side thereof,
wherein the second side guide comprises a first hole through the upper side thereof and a second hole through the lower side thereof,
wherein the first curved end portion of the upper guide is inserted into the first hole of the first side guide and the second curved end portion of the upper guide is inserted into the first hole of the second side guide, and
wherein the first curved end portion of the lower guide is inserted into the second hole of the first side guide and the second curved end portion of the lower guide is inserted into the second hole of the second side guide.

14. The rotor of claim 12, wherein the upper guide comprises a curved main body connecting the first curved end portion of the upper guide to the second end portion of the upper guide,
wherein a curvature of the curved main body of the upper guide is different from a curvature of the first curved end portion of the upper guide and a curvature of the second curved end portion of the upper guide,
wherein the lower guide comprises a curved main body connecting the first curved end portion of the lower guide to the second end portion of the lower guide, and
wherein a curvature of the curved main body of the lower guide is different from a curvature of the first curved end portion of the lower guide and a curvature of the second curved end portion of the lower guide.

15. A rotor comprising:
a rotor core including a pocket portion;
a guide disposed in the pocket portion; and
a magnet disposed in the guide,
wherein the guide includes:
two side guides respectively disposed on two side surfaces of the magnet;
an upper guide removably coupled to an upper side of each side guide of the two side guides; and
a lower guide removably coupled to a lower side of each side guide of the two side guides.

16. The rotor of claim 15, wherein the upper guide comprises two curved end portions opposite from each other and removably coupled to the two side guides, respectively, and
wherein the lower guide comprises two curved end portions opposite from each other and removably coupled to the two side guides, respectively.

17. The rotor of claim 16, wherein each side guide comprises a first hole through the upper side thereof and a second hole through the lower side thereof,
wherein the two curved end portions of the upper guide are inserted into the first holes of the side guides, respectively, and
wherein the two curved end portions of the lower guide are inserted into the second holes of the side guides, respectively.

18. A motor comprising:
a housing;
a stator disposed in the housing;
a rotor disposed in the stator;
a shaft coupled to the rotor; and
a cover disposed on the housing, wherein the rotor includes:
- a rotor core including a pocket portion;
- a guide disposed in the pocket portion; and
- a magnet disposed in the guide, wherein the guide includes:
- a first side guide disposed on a first side surface of the magnet;
- a second side guide disposed on a second side surface of the magnet, magnet;
- an upper guide coupled to an upper side of the first side guide and an upper side of the second side guide; and
- a lower guide coupled to a lower side of the first side guide and a lower side of the second side guide, wherein the upper guide is removably coupled to the first side guide and the second side guide, and wherein the lower guide is removably coupled to the first side guide and the second side guide.

19. The motor of claim 18, wherein the upper guide comprises a first curved end portion removably coupled to the upper side of the first side guide and a second curved end portion opposite from the first curved end portion and removably coupled to the upper side of second side guide, and wherein the lower guide comprises a first curved end portion removably coupled to the lower side of the first side guide and a second curved end portion opposite from the first curved end portion and removably coupled to the lower side of second side guide.

20. The motor of claim 19, wherein the first side guide comprises a first hole through the upper side thereof and a second hole through the lower side thereof, wherein the second side guide comprises a first hole through the upper side thereof and a second hole through the lower side thereof, wherein the first curved end portion of the upper guide is inserted into the first hole of the first side guide and the second curved end portion of the upper guide is inserted into the first hole of the second side guide, and wherein the first curved end portion of the lower guide is inserted into the second hole of the first side guide and the second curved end portion of the lower guide is inserted into the second hole of the second side guide.

* * * * *